United States Patent
Boecker et al.

(10) Patent No.: US 9,940,289 B2
(45) Date of Patent: Apr. 10, 2018

(54) PREVENTING ACCESS TO MISPLUGGED DEVICES BY A SERVICE PROCESSOR

(71) Applicant: International Business Machines Corporation, Armonk, NY (US)

(72) Inventors: Douglas M. Boecker, Rochester, MN (US); Santosh S. Puranik, Bangalore (IN); Jinu J. Thomas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 14/855,582

(22) Filed: Sep. 16, 2015

(65) Prior Publication Data

US 2017/0075850 A1    Mar. 16, 2017

(51) Int. Cl.
*G06F 13/40* (2006.01)
*G06F 11/07* (2006.01)
*G06F 13/00* (2006.01)

(52) U.S. Cl.
CPC ...... *G06F 13/4081* (2013.01); *G06F 11/0745* (2013.01); *G06F 11/0787* (2013.01)

(58) Field of Classification Search
CPC .................................................. G06F 13/4081
USPC ........................................................ 710/304
See application file for complete search history.

(56) References Cited

U.S. PATENT DOCUMENTS

| | | | |
|---|---|---|---|
| 5,530,895 A * | 6/1996 | Enstrom | G06F 9/4411 710/104 |
| 6,212,585 B1 * | 4/2001 | Chrabaszcz | H04L 29/06 709/220 |
| 6,226,762 B1 * | 5/2001 | Foote | H04B 1/74 709/224 |
| 7,496,029 B2 | 2/2009 | Sridhar et al. | |
| 7,600,227 B2 * | 10/2009 | Brockway | G06F 9/4411 717/176 |
| 8,108,731 B2 | 1/2012 | DeCusatis et al. | |
| 8,484,398 B2 | 7/2013 | Grasso et al. | |
| 8,898,484 B2 | 11/2014 | Buterbaugh et al. | |
| 2001/0039611 A1 * | 11/2001 | Lin | G06F 9/4413 713/1 |
| 2006/0288353 A1 * | 12/2006 | King | G06F 8/43 719/331 |
| 2007/0300115 A1 * | 12/2007 | Datta | G06F 11/2236 714/738 |
| 2008/0065874 A1 | 3/2008 | Geissler et al. | |
| 2014/0105029 A1 | 4/2014 | Jain et al. | |

* cited by examiner

*Primary Examiner* — Christopher Shin
(74) *Attorney, Agent, or Firm* — VanLeeuwen & VanLeeuwen; Steven L. Bennett

(57) ABSTRACT

An approach is provided for preventing access to mis=plugged devices by a service processor (SP). The SP retrieves an expected device identifier of a device associated with a hot-plug event. The hot-plug event was received in response to the device being connected to a selected port of a service processor, and the port is one many ports included in the SP. The SP sends a request for a device identifier via the port and actual device identifier is received from the device. The device is validated by comparing the expected device identifier with the actual device identifier. If the identifiers match, a link between the SP and the device is maintained. On the other hand, if the identifiers do not match, the link between the SP and the device is terminated or otherwise inhibited.

20 Claims, 5 Drawing Sheets

PREVENTING ACCESS TO MISPLUGGED DEVICES BY A SERVICE PROCESSOR

BACKGROUND

Technical Field

This disclosure relates to service processors, and more particularly, to unlinking devices from a service processor when the device is found to be incorrectly cabled to the service processor.

Description of Related Art

A Service Processor (SP) provides the ability to view and change the power-on settings of a running system. The SP allows connection and management of computing nodes that comprise a multi-node server. Multi node servers typically have cables that interconnect the nodes. For example, an SP could be housed in a control node while there could be multiple nodes housing compute hardware. The SP is connected to the Central Electronic Complex (CEC) hardware via a two way bus Field Replaceable Unit (FRU) Support Interface (FSI) bus. FSI links run in cables that connect the control node to the compute nodes. The control node has specific connector ports into which the interconnect cables are plugged. Each port is designated to connect to a specific compute node. When there are multiple compute nodes, cables can be mis-plugged while either assembling the server or while adding or maintaining nodes.

For example, a port that is supposed to be connected to compute node 1 may mistakenly be connected to node 2. Such mis-cabling cause the SP to access hardware on one node, believing it to be from another node. This leads to RAS (Reliability Availability Service) issues when calling out and identifying the failing hardware. Call-out data may not be collected or controlled via the same mis-plugged interface. Therefore, if allowed to access devices via the mis-plugged FSI, the call-out list would also be incorrect.

Traditional approaches use cable validation algorithms to deal with this problem by validating cables as part of the system initial program load (IPL). Validation of cables is done by providing I/O to provide a cable ID to the nodes. The SP can thus read the identifiers of the node connected at a specific port and compare it against the expected node identifiers for that port. The SP can then determine cable plugging errors and alert the user. However, these algorithms do not prevent the SP from accessing mis-plugged hardware. Consequently, the SP can still access hardware on the mis-plugged nodes and potentially read/write from/to such hardware, running a risk of putting the hardware in a bad state.

SUMMARY

An approach is provided for preventing access to mis=plugged devices by a service processor (SP). The SP retrieves an expected device identifier of a device associated with a hot-plug event. The hot-plug event was received in response to the device being connected to a selected port of a service processor, and the port is one many ports included in the SP. The SP sends a request for a device identifier via the port and actual device identifier is received from the device. The device is validated by comparing the expected device identifier with the actual device identifier. If the identifiers match, a link between the SP and the device is maintained. On the other hand, if the identifiers do not match, the link between the SP and the device is terminated or otherwise inhibited.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the present disclosure will be apparent in the non-limiting detailed description set forth below.

BRIEF DESCRIPTION OF THE DRAWINGS

Embodiments of the present invention may be better understood, and its numerous objects, features, and advantages made apparent to those skilled in the art by referencing the accompanying drawings, wherein.

DETAILED DESCRIPTION

Figure 1:
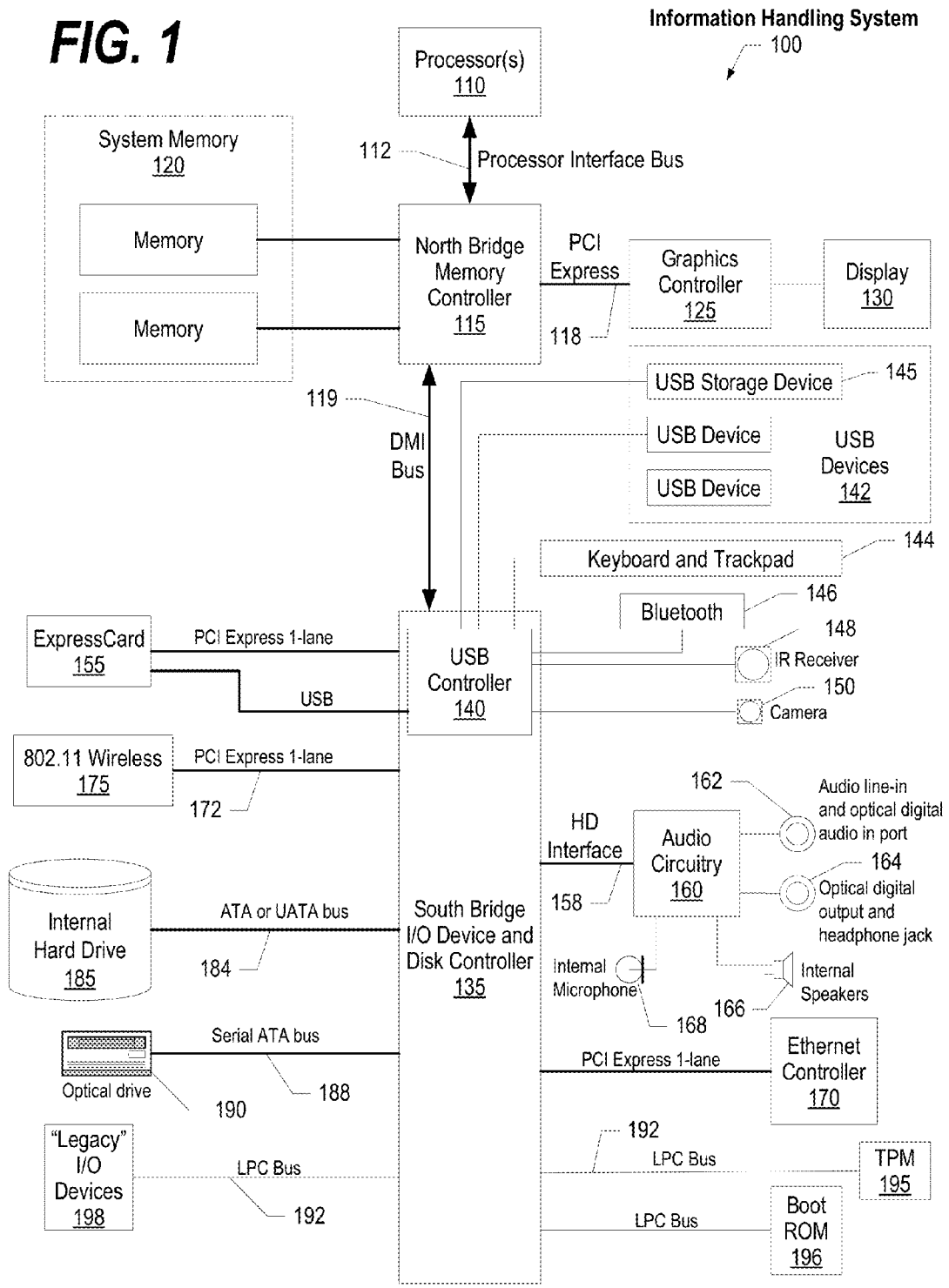
FIG. 1 depicts a block diagram of a processor and components of an information handling system.

FIGS. 1-5 show an approach for preventing access to misplugged devices by a service processor (SP). This approach prevents inadvertent access to mis-plugged hardware from the SP. The SP typically runs an Operating System (OS) or kernel that contains device drivers for the FSI interface. The hardware on the FSI bus are hot-plugged by the SP OS/KERNEL for use by various other SP components. For example on a Linux™ OS, udevd or an equivalent user-space application is responsible for creating device nodes under /dev. These device nodes act as an interface for the SP components to access the FRU hardware.

The approach centers around the premise that without a valid device node, the SP not be able to access the hardware. To elaborate, the component in the SP that processes OS/Kernel hot-plugs should have an additional responsibility of validating whether the cable carrying the signals that the SP uses to communicate to the hardware is properly plugged. If it deems the cable is incorrectly plugged, the OPERATING SYSTEM/Kernel (a) inhibits creation of a device node for the errant hot-plug, and (b) unlinks the device node, if already created, thereby preventing access to the wrong hardware.

Along with performing the above actions, the SP also alerts the management console about the incorrect plugging, calling out the wrongly connected cables and suitable recovery actions that can be initiated by an operator or technician to correct the problem. At the point of hot plug processing, the devices that are needed to perform the mis-plug callouts may not be available. In this case, callouts of the misplugged hardware may be deferred to legacy code validation algorithms performed during the system IPL.

In one embodiment, the implementation of the approach involves the following components: 1) The SP 2) The Kernel/OS on the SP, and 3) a "manager" component in the SP. A possible implementation is as follows:

(1) the SP Kernel/OS receives hot-plug events about hardware connected on the service interface;
(2) the manager component receives the hot-plug information and creates a device node for the hardware;
(3) the manager component carries out validation of the link between the SP and the hardware; and
(4) if the validation fails, the manager unlinks the device node created in step (2) and logs an appropriate error message for an operator or technician.

For example, in one environment, Building Block Kernel code detects hardware such as a CFAM IIC engine that drives 10 IIC buses with example identifiers of:

/dev/iic/L03C0E14P00, /dev/iic/L03C0E14P01, /dev/iic/L03C0E14P02, /dev/iic/L03C0E14P03, /dev/iic/L03C0E14P04, /dev/iic/L03C0E14P05, /dev/iic/L03C0E14P06, /dev/iic/L03C0E14P07, /dev/iic/L03C0E14P08, /dev/iic/L03C0E14P09, The Building Block Kernel generates a hot plug for each device path. A FRU manager component receives the hot plug data and creates the associated device nodes for the hardware. Then, following the approach described herein, cable validation is performed during this low level hot plug. If the cable validation passes, operation of the SP and plugged nodes operates normally. However, if the validation fails, the approach inhibits use of the associated device nodes. In this case the FRU manager deletes or otherwise unlinks the device nodes.

In a traditional environment, after hot plug processing on incorrectly connected enclosures is performed, the SP shows devices associated with the incorrectly cabled hardware. However, using the approach provided herein, the SP is prevented from accessing the mis-cabled hardware.

Using the example outlined above with 10 IIC buses, assume there is a CFAM on link 3 and a CFAM on link 5 each with 10 IIC buses. If cabled correctly one could see all devices.

For example:
>ls /dev/iic/L03*
/dev/iic/L03C0E14P00 /dev/iic/L03C0E14P01 /dev/iic/L03C0E14P02 /dev/iic/L03C0E14P03 /dev/iic/L03C0E14P04 /dev/iic/L03C0E14P05 /dev/iic/L03C0E14P06 /dev/iic/L03C0E14P07 /dev/iic/L03C0E14P08 /dev/iic/L03C0E14P09
>ls /dev/iic/L05*
/dev/iic/L05C0E14P00 /dev/iic/L05C0E14P01 /dev/iic/L05C0E14P02 /dev/iic/L05C0E14P03 /dev/iic/L05C0E14P04 /dev/iic/L05C0E14P05 /dev/iic/L05C0E14P06 /dev/iic/L05C0E14P07 /dev/iic/L05C0E14P08 /dev/iic/L05C0E14P09

In a traditional system, without using this approach, if cables are swapped, the SP would still show all devices available. The problem here is that all devices are available and visible to applications. However when communicating with devices on L03, an application or device is actually communicating with devices on L05 due to swapped cables.
For example:
>ls /dev/iic/L03*
/dev/iic/L03C0E14P00 /dev/iic/L03C0E14P01 /dev/iic/L03C0E14P02 /dev/iic/L03C0E14P03 /dev/iic/L03C0E14P04 /dev/iic/L03C0E14P05 /dev/iic/L03C0E14P06 /dev/iic/L03C0E14P07 /dev/iic/L03C0E14P08 /dev/iic/L03C0E14P09
>ls /dev/iic/L05*
/dev/iic/L05C0E14P00 /dev/iic/L05C0E14P01 /dev/iic/L05C0E14P02 /dev/iic/L05C0E14P03 /dev/iic/L05C0E14P04 /dev/iic/L05C0E14P05 /dev/iic/L05C0E14P06 /dev/iic/L05C0E14P07 /dev/iic/L05C0E14P08 /dev/iic/L05C0E14P09

With this invention doing conditional device availability based of plugging validation you would not see the devices as available. This conditional availability inhibits use of the device on invalid, swapped or mis-plugged interfaces. If cables have been swapped, the SP would not show any devices on either link available. For example:
>ls /dev/iic/L03*
<empty>
>ls /dev/iic/L05*
<empty>

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
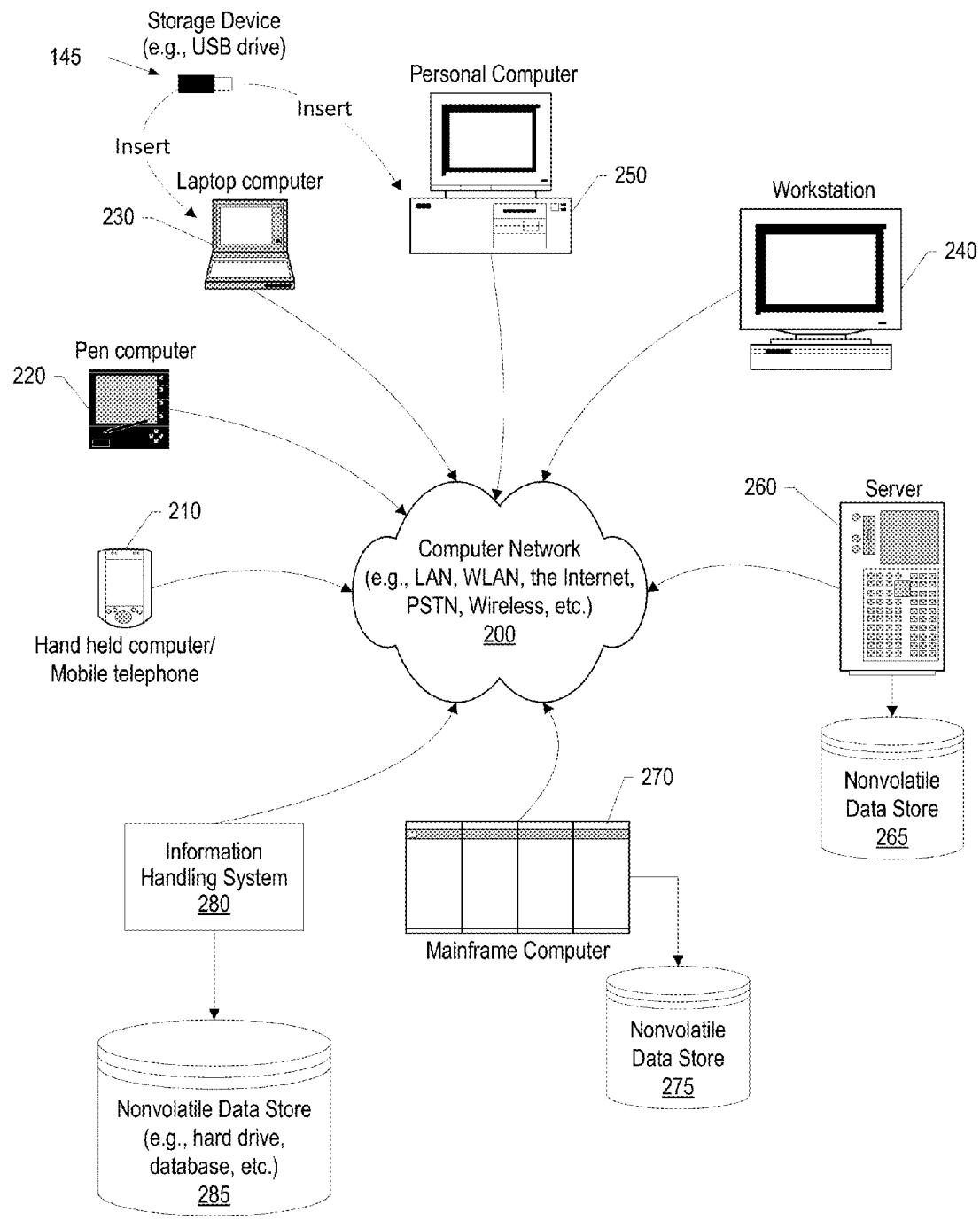
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
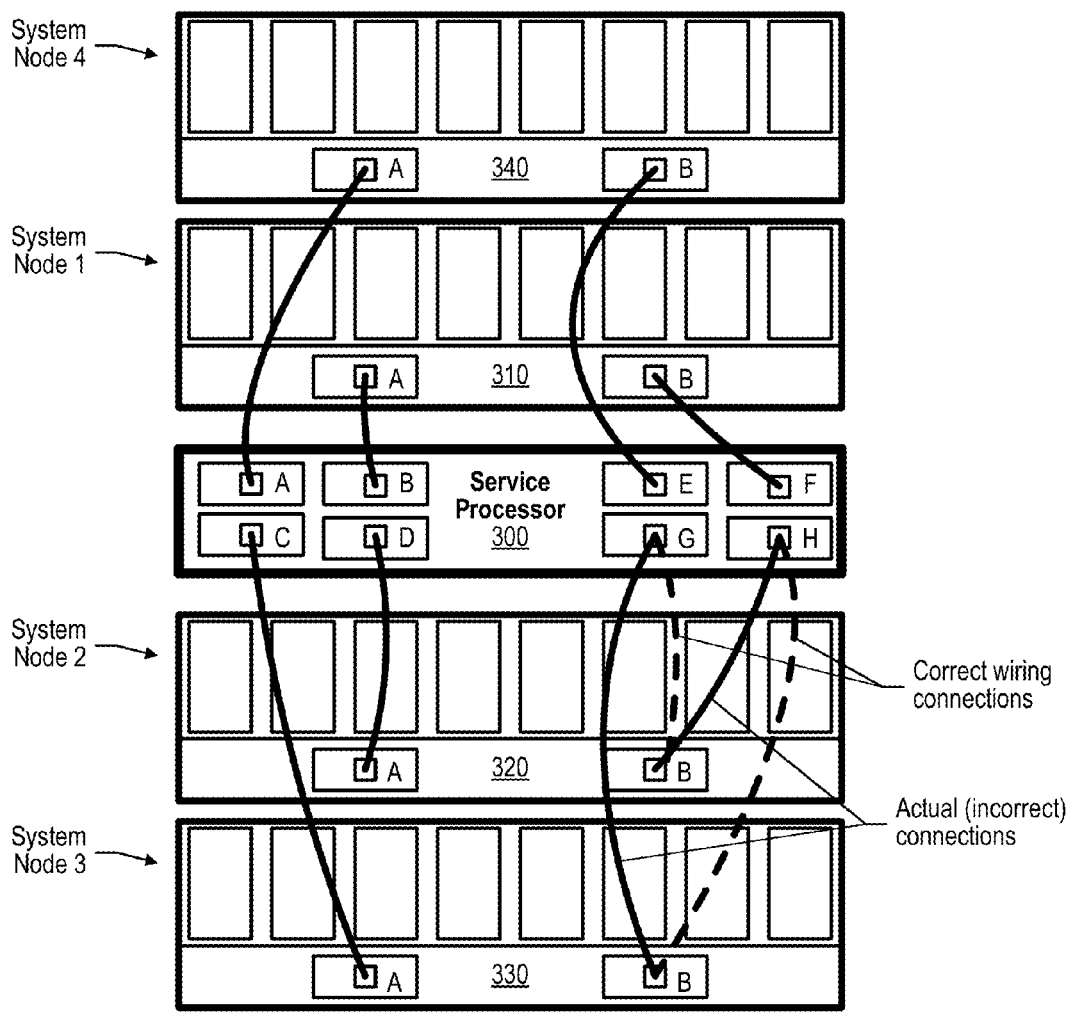
FIG. 3 is a diagram depicting erroneous connections between a service processor (SP) and nodes serviced by the SP.

FIG. 3 is a diagram depicting erroneous connections between a service processor (SP) and nodes serviced by the SP. SP 300 is shown with eight ports, labeled A through H. Four system nodes are shown connected to SP 300 (node 1 (310), node 2 (320), node 3 (330), and node 4 (340). Each of these nodes is shown with two ports connected to the SP. To aid in particularly referencing each port, each port is referenced with its system number and port reference. For example 300(A) refers to the A port in the service processor (300), while 330(B) refers to the B port in system node 3 (330).

Each system node has two connections to the SP. System node 1 (310) has port 310(A) connected to SP port 300(B) and port 310(B) connected to SP port 300(F). System node 2 (320) has port 320(A) connected to SP port 300(D) and port 320(B) connected to SP port 300(H). System node 3 (330) has port 330(A) connected to SP port 300(C) and port 330(B) connected to SP port 300(G). Finally, system node 4 (340) has port 340(A) connected to SP port 300(A) and port 340(B) connected to SP port 300(E).

In the example shown, an error has occurred when system nodes 2 and 3 were connected (wired) to SP 300. Namely, system node 2 (320) port 320(B) was supposed to be connected to SP port 300(G) and system node 3 (330) port 330(B) was supposed to be connected to SP port 330(H), but instead the cables were crossed. In the example, the SP will receive configuration data indicating that system node 2 is connected to SP port 300(G) and that system node 3 is connected to SP port 300(H), but instead system node 2 is connected to SP port 300(H) and that system node 3 is connected to SP port 300(G).

Figure 5:
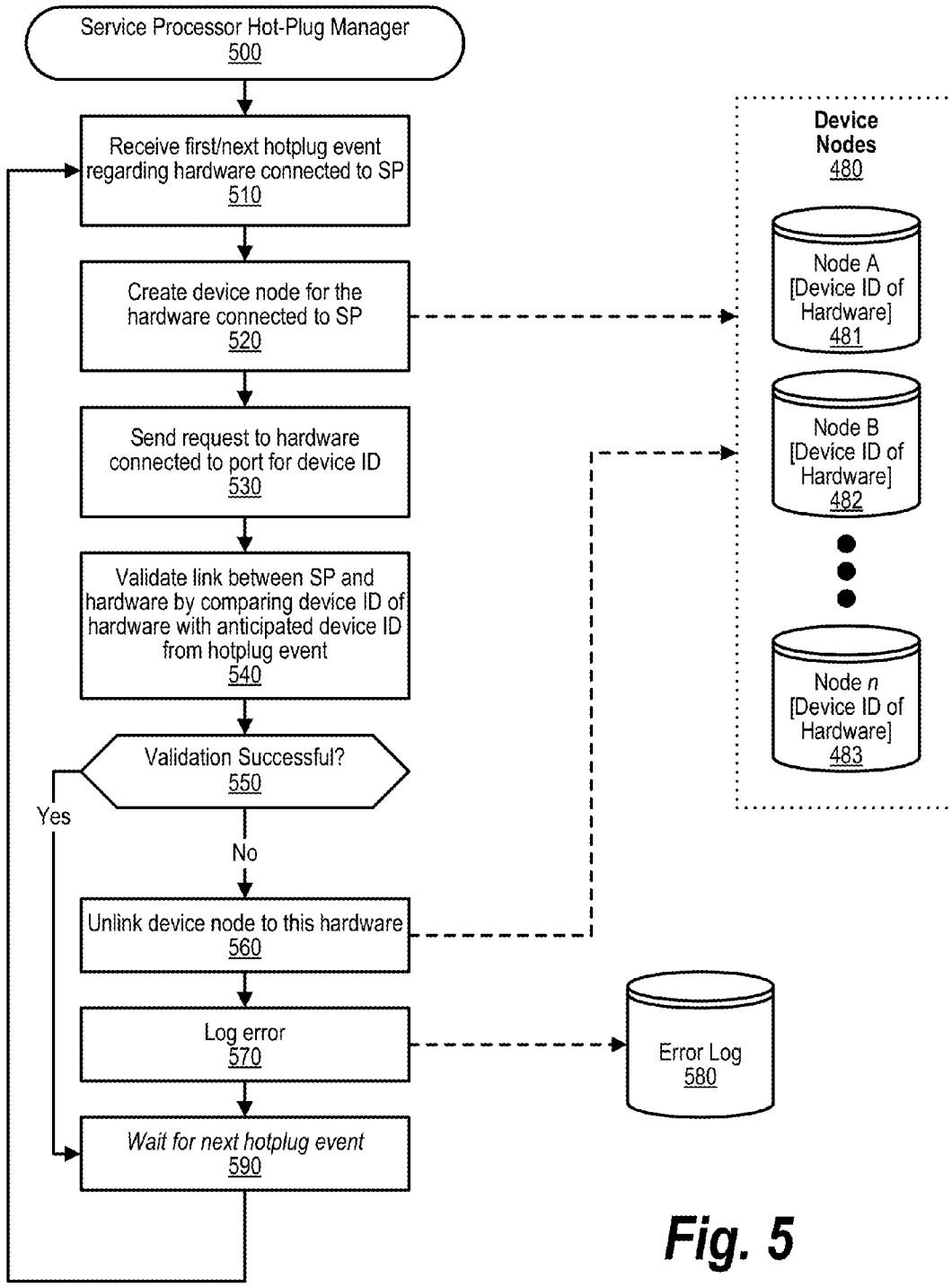
FIG. 5 is a flowchart showing steps taken by a service processor (SP) hot-plug manager in preventing access to mis-plugged devices by the SP.

During hot plug manager processing shown in FIG. 5, the SP will send a request via port 300(G) and 300(H) and will detect that the devices connected to these ports do not match the expected device identifiers. In particular, at port 300(G) the device identifier of system node 3 will be received instead of the expected device identifier of system node 2. Likewise, at port 300(H) the device identifier of system node 2 will be received instead of the expected device identifier of system node 3. As a result, the hot plug manager will unlink both devices (system nodes 2 and 3) from the SP.

In contrast, system nodes 1 and 4 are shown properly wired with the respective devices connected to the correct ports. Because the expected device identifiers match the actual device identifiers, the hot plug manager will maintain the links between the SP and system nodes 1 and 4.

Figure 4:
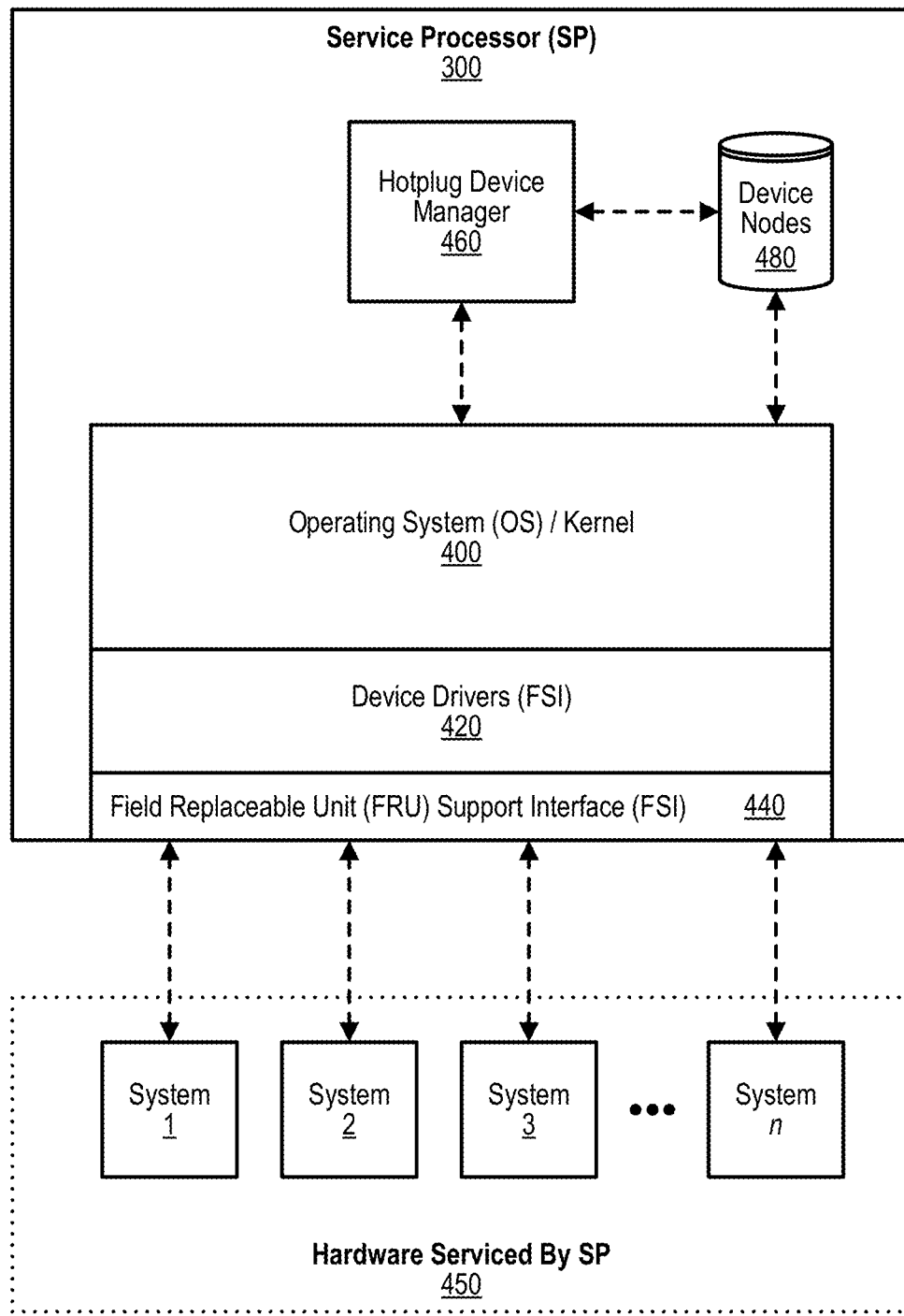
FIG. 4 is a component diagram depicting communication flow between components involved in preventing access to mis-plugged devices by a service processor (SP)

FIG. 4 is a component diagram depicting communication flow between components involved in preventing access to mis-plugged devices by a service processor (SP). In one embodiment, SP 300 executes operating system 400 and/or kernel that controls operation of the SP. When hardware serviced by the SP (system 1, 2, 3, etc.) are connected to the SP, the connection is made using a field replaceable unit (FRU) support interface (FSI) 440. These interfaces are managed by device drivers 420 that, in turn, communicate with operating system 400 regarding devices being plugged into and unplugged from the SP.

When a device is plugged into the SP, the operating system creates a device node for the hardware that is plugged into the SP. These device nodes are stored in memory area 480. In one embodiment, the expected device identifier of the device is stored in the device node. The operating system triggers an event that is handled by the service processor's hot plug manager 460.

Hot plug manager 460 receives the event relating to a device being hot plugged to the SP. The hot plug manager requests the device identifier from the device using the port associated with the hot plug event. The hot plug manager receives the actual device identifier from the device over the port. The actual device identifier is compared to the expected device identifier (e.g., stored in device node 480 corresponding to the device, etc.). If the actual device identifier matches the expected device identifier, then the hot plug manager maintains the link established between the SP and the device. On the other hand, if the actual device identifier does not match the expected device identifier, then the hot plug manager terminates, or otherwise inhibits, the link between the SP and the device.

FIG. 5 is a flowchart showing steps taken by a service processor (SP) hot-plug manager in preventing access to mis-plugged devices by the SP. FIG. 5 processing commences at 500 and shows the steps taken by the service processor's Hot-Plug Manager that manages hot plug events when a device is connected to the SP.

At step 510, the process receives a hot plug event regarding a device that was connected to the SP. At step 520, the process creates device node for the device connected to SP. In one embodiment, the operating system creates the device node before the hot plug manager receives the signal that a device was connected to the SP. Device nodes 480 include a data structure for each device connected to the SP. The data structure includes the expected device identifier of the device. Node A (481), Node B (482) through Node n (483) are depicted as individual device nodes stored in device nodes data store 480.

At step 530, the process sends a request for the actual device identifier to the device connected to the port at which the hot plug event occurred. The hot plug manager uses the port to receive the actual device identifier. In the case of a cabling error, the device's actual identifier will be different than the expected device identifier stored in the device node. At step 540, the process validates link between the SP and the device by comparing the actual device identifier of the device returned over the port with the anticipated, or expected, device identifier from the hot plug event with the expected device identifier being retrieved from the appropriate device node corresponding with the hot plug event.

The process determines as to whether validation of the device was successful (decision 550). Validation is successful when the actual device identifier matches the expected device identifier. If validation was successful, then decision 550 branches to the 'yes' branch maintaining the link between the SP and the device and bypassing steps 560 and 570. On the other hand, if validation was unsuccessful, then decision 550 branches to the 'no' branch to unlink the device from the SP and log an error by executing steps 560 and 570.

At step 560, the process unlinks the device from the SP. in one embodiment, the hot plug manager unlinks the device by altering or deleting the device's device node in such a way that the device node will no longer be used by the SP. At step 570, the process logs error that is stored in error log data store 580 with the error log indicating the mismatch between the actual and the expected device identifiers, the port on the SP over which the error occurred, and the device node that was unlinked due to the error.

At step 590, the process waits for next hot plug event. When the next hot plug event is received, processing loops back to step 510 to receive and process the event as described above. This looping continues while the SP and the hot plug manager are in operation.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method executed by an information handling system comprising one or more processors and a memory, the method comprising:
retrieving an expected device identifier of a device associated with a hot-plug event that was received in response to the device being connected to a selected port of a service processor, wherein the selected port is one of a plurality of ports included at the service processor;
sending a request for a device identifier via the selected port;
receiving, at the selected port, an actual device identifier;
validating the device by comparing the expected device identifier with the actual device identifier;
maintaining a link between the service processor and the device in response to the expected device identifier matching the actual device identifier; and
inhibiting the link between the service processor and the device in response to the expected device identifier failing to match the actual device identifier.

2. The method of claim 1 further comprising:
creating a device node corresponding to the device connected to the service processor prior to the validating; and
unlinking the device node in response to the expected device identifier failing to match the actual device identifier.

3. The method of claim 2 wherein:
an operating system running in the service processor that creates the device node; and
a device manager routine running in the service processor that validates the device and unlinks the device node in response to the expected device identifier failing to match the actual device identifier.

4. The method of claim 3 further comprising:
detecting, at the operating system via a device driver, that the device has been connected to the service processor via a cable connection; and
sending the hot-plug event from the operating system to the device manager routine.

5. The method of claim 1 further comprising:
logging an error in response to the expected device identifier failing to match the actual device identifier.

6. The method of claim 1 further comprising:
receiving a request to list devices at the service processor, wherein the request includes the expected device identifier; and
providing, from the service processor, a set of device identifiers matching the request, wherein the set of device identifiers inhibits inclusion of the actual device identifier and the expected device identifier in response to the expected device identifier failing to match the actual device identifier.

7. The method of claim 1 wherein the hot-plug event is caused from a detection that the device has been cabled to the selected port of the service processor.

8. A service processor comprising:
one or more processors;
a plurality of ports accessible by at least one of the processors that are used to connect one or more devices to the service processor;
a memory coupled to at least one of the processors; and
a set of instructions stored in the memory and executed by at least one of the processors, wherein the set of instructions perform actions comprising:
retrieving an expected device identifier of a device associated with a hot-plug event that was received in response to the device being connected to a selected port of a service processor, wherein the selected port is one of a plurality of ports included at the service processor;
sending a request for a device identifier via the selected port;
receiving, at the selected port, an actual device identifier;
validating the device by comparing the expected device identifier with the actual device identifier;
maintaining a link between the service processor and the device in response to the expected device identifier matching the actual device identifier; and
inhibiting the link between the service processor and the device in response to the expected device identifier failing to match the actual device identifier.

9. The service processor of claim 8 further wherein the actions further comprise:
creating a device node corresponding to the device connected to the service processor prior to the validating; and
unlinking the device node in response to the expected device identifier failing to match the actual device identifier.

10. The service processor of claim 9 wherein:
an operating system stored in the memory and executed by at least one of the processors creates the device node; and
a device manager routine stored in the memory and executed by at least one of the processors validates the device and unlinks the device node in response to the expected device identifier failing to match the actual device identifier.

11. The service processor of claim 10 wherein the actions further comprise:
detecting, at the operating system via a device driver, that the device has been connected to the service processor via a cable connection; and
sending the hot-plug event from the operating system to the device manager routine.

12. The service processor of claim 8 wherein the actions further comprise:
logging an error in response to the expected device identifier failing to match the actual device identifier.

13. The service processor of claim 8 wherein the actions further comprise:
receiving a request to list devices at the service processor, wherein the request includes the expected device identifier; and
providing, from the service processor, a set of device identifiers matching the request, wherein the set of device identifiers inhibits inclusion of the actual device identifier and the expected device identifier in response to the expected device identifier failing to match the actual device identifier.

14. The service processor of claim 8 wherein the hot-plug event is caused from a detection that the device has been cabled to the selected port of the service processor.

15. A computer program product stored in a computer readable storage medium, comprising computer instructions that, when executed by an information handling system, causes the information handling system to perform actions comprising:
retrieving an expected device identifier of a device associated with a hot-plug event that was received in response to the device being connected to a selected port of a service processor, wherein the selected port is one of a plurality of ports included at the service processor;
sending a request for a device identifier via the selected port;
receiving, at the selected port, an actual device identifier;
validating the device by comparing the expected device identifier with the actual device identifier;
maintaining a link between the service processor and the device in response to the expected device identifier matching the actual device identifier; and
inhibiting the link between the service processor and the device in response to the expected device identifier failing to match the actual device identifier.

16. The computer program product of claim 15 wherein the actions further comprise:
creating a device node corresponding to the device connected to the service processor prior to the validating; and unlinking the device node in response to the expected device identifier failing to match the actual device identifier.

17. The computer program product of claim 16 wherein:
an operating system running in the service processor creates the device node; and
a device manager routine running in the service processor validates the device and unlinks the device node in response to the expected device identifier failing to match the actual device identifier.

18. The computer program product of claim 17 wherein the actions further comprise:
detecting, at the operating system via a device driver, that the device has been connected to the service processor via a cable connection; and
sending the hot-plug event from the operating system to the device manager routine.

19. The computer program product of claim 15 wherein the actions further comprise:
logging an error in response to the expected device identifier failing to match the actual device identifier.

20. The computer program product of claim 15 wherein the actions further comprise:
receiving a request to list devices at the service processor, wherein the request includes the expected device identifier; and
providing, from the service processor, a set of device identifiers matching the request, wherein the set of device identifiers inhibits inclusion of the actual device identifier and the expected device identifier in response to the expected device identifier failing to match the actual device identifier.

\* \* \* \* \*